US012086363B2

United States Patent
Elian et al.

(10) Patent No.: US 12,086,363 B2
(45) Date of Patent: Sep. 10, 2024

(54) SENSOR DEVICES HAVING AN ACOUSTIC COUPLING MEDIUM, AND ASSOCIATED MANUFACTURING METHODS

(71) Applicant: Infineon Technologies AG, Neubiberg (DE)

(72) Inventors: Klaus Elian, Alteglofsheim (DE); Christoph Steiner, St. Margarethen a. d. Raab (AT); Horst Theuss, Wenzenbach (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/456,754

(22) Filed: Aug. 28, 2023

(65) Prior Publication Data
US 2024/0086017 A1 Mar. 14, 2024

(30) Foreign Application Priority Data
Sep. 8, 2022 (DE) .......................... 102022122821.5

(51) Int. Cl.
*G06F 3/043* (2006.01)
*B06B 1/02* (2006.01)

(52) U.S. Cl.
CPC .......... *G06F 3/0436* (2013.01); *B06B 1/0292* (2013.01); *G06F 2203/04103* (2013.01)

(58) Field of Classification Search
CPC ......... G06F 3/0436; G06F 2203/04103; B06B 1/0292
See application file for complete search history.

(56) References Cited

U.S. PATENT DOCUMENTS

| | | | |
|---|---|---|---|
| 9,984,271 B1* | 5/2018 | King | G06F 3/0436 |
| 2005/0288590 A1* | 12/2005 | Kaplan | A61B 5/6882 600/459 |
| 2013/0285174 A1 | 10/2013 | Sako et al. | |
| 2015/0070597 A1* | 3/2015 | Hsieh | G06F 3/04182 349/12 |
| 2015/0169136 A1* | 6/2015 | Ganti | G06F 3/0436 345/177 |
| 2016/0107194 A1* | 4/2016 | Panchawagh | B06B 1/0666 310/317 |
| 2017/0323133 A1* | 11/2017 | Tsai | G06V 40/1329 |
| 2018/0029077 A1 | 2/2018 | Dekker et al. | |
| 2019/0043920 A1* | 2/2019 | Berger | H10N 30/308 |
| 2020/0356196 A1* | 11/2020 | Strohmann | G01S 7/52026 |
| 2023/0086418 A1* | 3/2023 | Strohmann | H10K 59/65 382/124 |

FOREIGN PATENT DOCUMENTS

JP 2006319712 A1 11/2006

* cited by examiner

*Primary Examiner* — Ryan A Lubit
(74) *Attorney, Agent, or Firm* — Harrity & Harrity, LLP (57) ABSTRACT

A sensor device contains at least one sensor chip having at least one MEMS structure arranged at a main surface of the at least one sensor chip, wherein the at least one sensor chip is configured to transmit ultrasonic signals and/or to receive ultrasonic signals. The sensor device further contains an acoustic coupling medium arranged selectively on the at least one MEMS structure, wherein the acoustic coupling medium is configured to decouple an ultrasonic signal to be emitted from the at least one MEMS structure and/or to inject a received ultrasonic signal into the at least one MEMS structure. The acoustic coupling medium only partially covers the main surface of the at least one sensor chip.

20 Claims, 5 Drawing Sheets

SENSOR DEVICES HAVING AN ACOUSTIC COUPLING MEDIUM, AND ASSOCIATED MANUFACTURING METHODS

CROSS REFERENCE TO RELATED APPLICATION

This application claims priority to German Patent Application No. 102022122821.5 filed on Sep. 8, 2022, the content of which is incorporated by reference herein in its entirety.

TECHNICAL FIELD

The present disclosure relates to sensor devices having an acoustic coupling medium, and associated manufacturing methods.

BACKGROUND

In many technical applications, such as, for example, touchscreens, sensors are positioned at a touch-sensitive surface in order to detect physical contact between the surface and an operator. An adequate acoustic coupling should be present between the touch-sensitive surface and the sensor in order to guarantee a suitable mode of operation of the respective application. However, the required acoustic coupling can often be defective due to cavities, air bubbles or impurities between the touch-sensitive surface and the sensor. Manufacturers and developers of sensor devices are constantly endeavoring to improve their products. It can be of particular interest here to provide sensor devices having an improved acoustic coupling, and associated manufacturing methods.

SUMMARY

Different aspects relate to a sensor device. The sensor device includes at least one sensor chip having at least one MEMS structure arranged at a main surface of the at least one sensor chip, wherein the at least one sensor chip is configured to transmit ultrasonic signals and/or to receive ultrasonic signals. The sensor device further includes an acoustic coupling medium arranged selectively on the at least one MEMS structure, wherein the acoustic coupling medium is configured to decouple an ultrasonic signal to be emitted from the at least one MEMS structure and/or to inject a received ultrasonic signal into the at least one MEMS structure. The acoustic coupling medium only partially covers the main surface of the at least one sensor chip.

Different aspects relate to a method. The method includes providing a semiconductor wafer. The method further includes forming MEMS structures at a main surface of the semiconductor wafer, wherein the respective MEMS structure is configured to transmit ultrasonic signals and/or to receive ultrasonic signals. The method further includes selectively depositing an acoustic coupling medium on the MEMS structures, wherein the acoustic coupling medium is configured to decouple an ultrasonic signal to be emitted from the respective MEMS structure and/or to inject a received ultrasonic signal into the respective MEMS structure. The method further includes separating the semiconductor wafer into a plurality of sensor chips, wherein the acoustic coupling medium assigned to a respective sensor chip only partially covers the main surface of the respective sensor chip.

BRIEF DESCRIPTION OF THE DRAWINGS

Devices and methods according to the disclosure are explained in detail below with reference to drawings. The elements shown in the drawings are not necessarily presented true-to-scale in relation to one another. Identical reference numbers can denote identical components.

DETAILED DESCRIPTION

In the following detailed description, reference is made to the attached drawings which show, for illustrative purposes, specific aspects and implementations in which the disclosure can be implemented in practice. In this context, directional terms such as, for example, "above", "below", "in front", "behind", etc., can be used with reference to the alignment of the described figures. Since the components of the described implementations can be positioned in different alignments, the directional terms can be used for illustrative purposes and are in no way limiting. Different aspects can be used and structural or logical changes can be made without departing the concept of the present disclosure. This means that the following detailed description is not to be understood in a limiting sense.

Figure 1A:
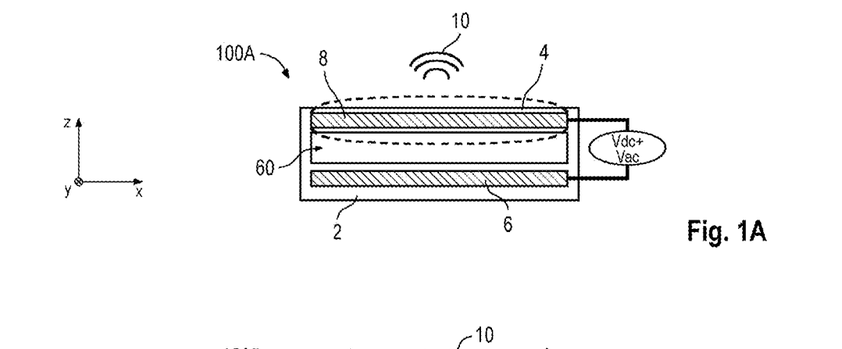
FIGS. 1A and 1B show schematically cross-section side views of MEMS components 100A and 100B.
Figure 1B:
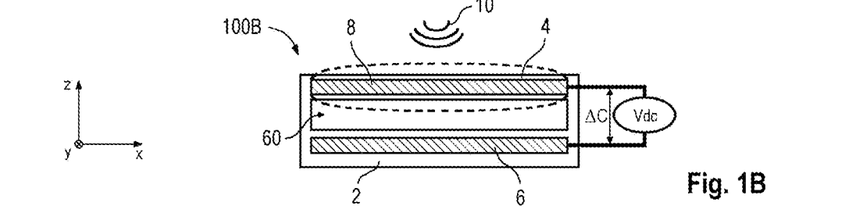

FIGS. 1A and 1B show MEMS components 100A and 100B in different operational states. The MEMS component 100A shown in FIG. 1A can be manufactured from a semiconductor substrate 2 which can, in particular, be a silicon substrate. A movable MEMS structure 4 can be arranged in the upper area of the MEMS component 100A. In one example, the MEMS structure 4 can contain a movable membrane or can correspond to a movable membrane of this type. In the example shown, the MEMS structure 4 can be movable in the z-direction, wherein positively and negatively deflected states of the MEMS structure 4 are indicated by dashed lines.

In the upper area of the MEMS component 100A, a first electrode 6 can be formed in a fixed manner in the semiconductor substrate 2. A second electrode 8 can further be formed in the MEMS structure 4 in the upper area of the MEMS component 100A. In the event of a deflection of the MEMS structure 4, the second electrode 8 can move accordingly along with the MEMS structure 4. A cavity 60 in which, in particular, a vacuum can prevail can be formed between the two electrodes 6 and 8. The two electrodes 6 and 8 can form a capacitor whose capacitance C can depend on the spacing of the electrodes 6, 8 and therefore on a deflection of the movable MEMS structure 4.

The MEMS component 100A can be configured to transmit acoustic signals which can, in particular, be ultrasonic signals. FIG. 1A shows a corresponding transmit operation of the MEMS component 100A. An AC voltage Vac which can be superimposed, in particular, with a DC voltage Vdc can be applied to the two electrodes 6 and 8 (see Vdc+Vac). Driven by the applied electrical voltage, the movable MEMS structure 4 with the second electrode 8 integrated therein can begin to vibrate, in particular at the frequency of the AC voltage Vac. The vibrations of the MEMS structure 4 can result in emitted ultrasonic signals 10 which are indicated, by way of example, by a number of wave fronts.

The MEMS component 100B shown in FIG. 1B can be similar or structurally identical to the MEMS component 100A. The MEMS component 100B can be configured to receive or capture acoustic signals, in particular ultrasonic signals. FIG. 1B shows a corresponding receive operation of the MEMS component 100B. During the receive operation, a DC voltage Vdc can be applied to or tapped from the two electrodes 6 and 8. An incoming ultrasonic signal 10 can deflect or cause to vibrate the movable MEMS structure 4 with the second electrode 8 integrated therein. The spacing between the two electrodes 6, 8 and therefore the capacitance C of the capacitor formed by the electrodes 6, 8 can change due to the deflection of the MEMS structure 4 in the z-direction (cf. ΔC). The capacitance change ΔC can result in a change in a voltage tapped between the electrodes 6 and 8. The received ultrasonic signal 10 can be detected and its characteristics can be assessed based on the measured voltage or voltage change.

The MEMS components 100A and 100B can be based on a capacitive mode of operation and/or an ultrasonic pressure sensor system. In the example shown, the MEMS components 100A and 100B can be two separate components which can provide the transmit operation and receive operation separately from one another. In a further example, a single MEMS component can combine the functionalities of the two MEMS components 100A and 100B and can be configured for both transmit and receive operation. A MEMS component of this type can not only have a single MEMS structure for this purpose, but can use two MEMS structure that are separated from one another.

Figure 2:
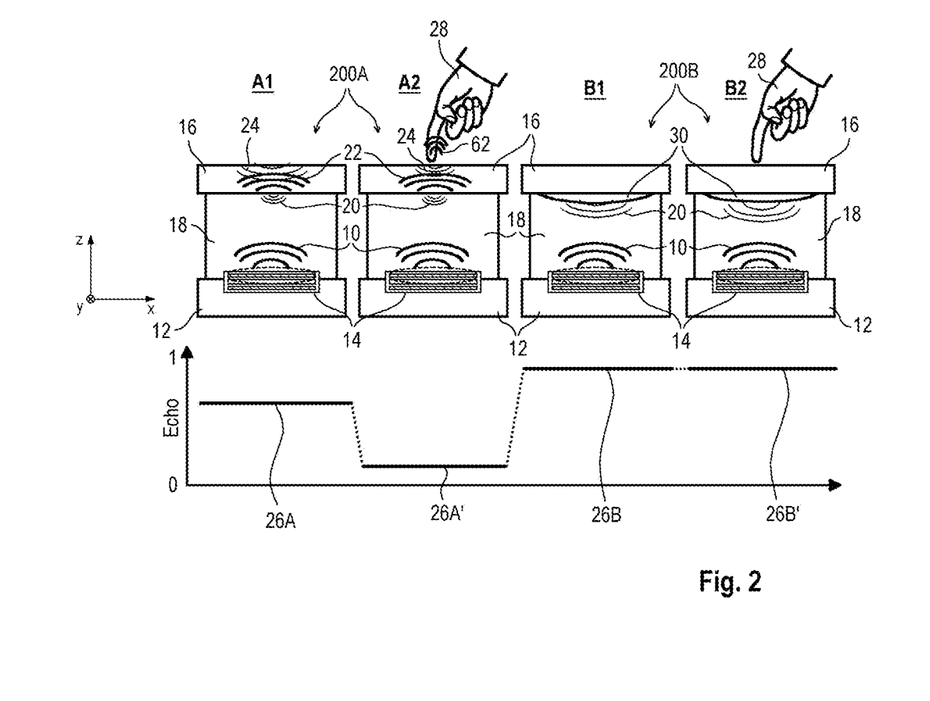
FIG. 2 shows schematically cross-section side views of sensor devices 200A and 200B in different operational states, and measurement signals output by the sensor devices 200A and 200B.

FIG. 2 shows two operational states A1 and A2 of a sensor device 200A and two operational states B1 and B2 of a sensor device 200B. FIG. 2 additionally shows measurement signals output by the sensor devices 200A and 200B during the operational states.

The sensor device 200A can contain a sensor chip (or sensor IC) 12 having a MEMS component 14. The MEMS component 14 can be similar to at least one of the MEMS components 100A and 100B shown in FIGS. 1A and 1B. The MEMS component 14 can be configured, in particular, for both a transmit operation and a receive operation. A touch-sensitive structure 16 which can, for example, be a touchscreen, can be arranged above the sensor chip 12. An acoustic coupling medium 18 which couples the MEMS component 14 and the touch-sensitive structure 16 acoustically to one another can be arranged between the sensor chip 12 and the touch-sensitive structure 16. The touch-sensitive structure 16 and/or the acoustic coupling medium 18 can be regarded as part of the sensor device 200A or not.

A first operational state A1 of the sensor device 200A is shown on the far left in FIG. 2. The MEMS component 14 can emit (in particular temporally periodic) ultrasonic signals 10 in the z-direction during this operational state. The emitted ultrasonic signals 10 can pass through the acoustic coupling medium 18 and arrive at a boundary surface between the acoustic coupling medium 18 and the touch-sensitive structure 16. A first component 20 of the ultrasonic signals 10 can be reflected from the boundary surface back into the acoustic coupling medium 18. The reflected signal component 20 can be referred to as a (first) echo.

A second component 22 of the ultrasonic signals 10 can cross the boundary surface, pass through the touch-sensitive structure 16 and finally arrive from within at the upper side of the touch-sensitive structure 16. The upper side can correspond to a boundary surface between the touch-sensitive structure 16 and the environment (in particular air). At least one portion 24 of the signal component 22 can be reflected at this boundary surface. The reflected signal component 24 can be referred to as a (second) echo. The reflected signal components or echoes 20 and 24 can both pass through the arrangement in the z-direction and can be received or captured by the MEMS component 14. Based on this (total) echo detected by the MEMS component 14, the sensor device 200A can output a measurement signal 26A which can correspond to an essentially constant value.

FIG. 2 further shows a second operational state A2 of the sensor device 200A in which an operator (or user) 28 touches the upper side of the touch-sensitive structure. Ultrasonic signals 10 transmitted by the MEMS component 14 can travel in a manner similar to the first operational state A1 and can be reflected in a similar manner. In contrast to the first operational state A1, the operator 28 can absorb a part 62 of the signal energy that has reached the upper side of the touch-sensitive structure 16. As a result, the reflected signal component 24 of the second operational state A2 can be reduced in comparison with the first operational state A1.

Due to the comparatively smaller (total) echo, a measurement signal A2 output by the sensor device 200A in the operational state A2 can be smaller and can correspond, for example, to a smaller, essentially constant, value. Since the two described operational states A1 and A2 of the sensor device 200A provide distinguishable measurement signals 26A and 26A', the sensor device 200A can be configured to determine, based on a captured measurement signal, whether the touch-sensitive structure 16 is touched by an operator 28 or not.

The sensor device 200B can have some or all of the features of the sensor device 200A. In contrast to the sensor device 200A, (unwanted) impurities 30 can be present in the sensor device 200B in a boundary area between the upper side of the acoustic coupling medium 18 and the lower side of the touch-sensitive structure 16. The impurities 30 can, for example, contain one or more of the following: air bubbles, cavities, dirt, plastic particles, dust particles, etc.

The MEMS component 14 can emit (in particular temporally periodic) ultrasonic signals 10 in the z-direction during a first operational state B1 of the sensor device 200B. Emitted ultrasonic signals 10 can pass through the acoustic coupling medium 18 and can least partially arrive at the impurities 30. In the example shown, so many impurities 30 can potentially be present that essentially no signal components can penetrate the impurities 30. A reflected signal component 20 can pass through the acoustic coupling medium 18 in the negative z-direction and can be received or captured by the MEMS component 14. Based on the captured echo, the sensor device 200B can output a measurement signal 26B which can correspond to an essentially constant value.

FIG. 2 further shows on the far right a second operational state B2 of the sensor device 200B in which an operator 28 touches the upper side of the touch-sensitive structure. The ultrasonic signals 10 transmitted by the MEMS component 14 can travel in a manner similar to the first operational state B1 and can be reflected in a similar manner. Since, similar to the operational state B1, the ultrasonic signals 10 essentially cannot penetrate the impurities 30, a measurement signal 26B' output by the sensor device 200B can be essentially identical in the operational state B2 to the measurement signal 26B in the operational state B1. Due to the impurities 30, the sensor device 200B is correspondingly incapable of determining, based on a captured measurement signal, whether the touch-sensitive structure 16 is touched by an operator 28 or not.

Figure 3:
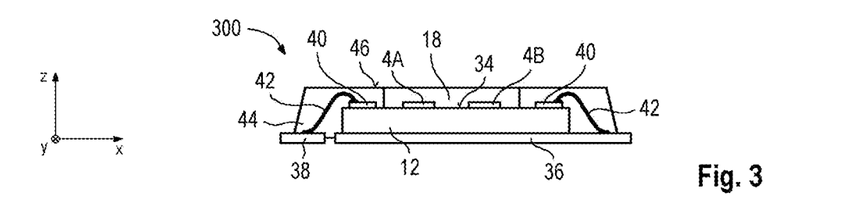
FIG. 3 shows schematically a cross-section side view of a sensor device 300 according to the disclosure.

The sensor device 300 shown in FIG. 3 can have some or all of the features of sensor devices described above. The sensor device 300 can contain at least one sensor chip 12 having at least one MEMS structure 4A, 4B arranged at a main surface 34 of the at least one sensor chip 12. The at least one sensor chip 12 can be configured to transmit ultrasonic signals and/or to receive ultrasonic signals, as described, for example, in conjunction with FIG. 1. The sensor device 300 can therefore also be referred to as an ultrasonic sensor device or ultrasonic sensor. In the example shown, the sensor device 300 can have a single sensor chip 12 having two mems structures 4A and 4B arranged at its upper main surface 34. The first MEMS structure 4A can be configured to transmit ultrasonic signals, whereas the second MEMS structure 4B can be configured to receive or capture ultrasonic signals.

The sensor chip 12 shown in FIG. 3 can be at least partially similar to the sensor chip 12 shown in FIG. 2 and can be based on a capacitive mode of operation and or an ultrasonic pressure sensor system. In particular, the sensor chip 12 can contain or correspond to at least one capacitive micromachined ultrasonic transducer (CMUT). In terms of the frequencies of transmitted/received ultrasonic signals, the sensor device 300 can be configured in a general case to operate within a frequency range from around 20 kHz to around 1 GHz. In more specific cases, the operating frequencies can lie within a range from around 500 kHz to around 10 MHz, or more precisely from around 1 MHz to around 10 MHz, or more precisely from around 1 MHz to around 5 MHz, or even more precisely from around 1 MHz to around 2 MHz.

The sensor device 300 can have an acoustic coupling medium 18 which is arranged or deposited selectively on the MEMS structures 4A and 4B. The acoustic coupling medium 18 can be configured to decouple ultrasonic signals to be transmitted from the first MEMS structure 4A and to inject ultrasonic signals to be received into the second MEMS structure 4B. The acoustic coupling medium 18 can cover, in particular completely, both MEMS structures 4A and 4B. In contrast thereto, the acoustic coupling medium 18 can only partially cover the main surface 34 of the sensor chip 12.

In the example shown, the MEMS structures 4A, 4B and the acoustic coupling medium 18 covering them can be arranged essentially centrally on the main surface 34 of the sensor chip 12. Outer areas of the main surface 34 can therefore remain uncovered by the acoustic coupling medium 18. In particular, the acoustic coupling medium 18 can cover only the MEMS structures 4A, 4B, and can leave all further components arranged on or at the main surface 34 uncovered. In the case shown, electrical contacts 40 and or electrical connection elements 42 arranged, by way of example, at the main surface 34 can remain uncovered by the acoustic coupling medium 18. The acoustic coupling medium 18 can cover less than around 50 percent, or less than around 45 percent, or less than around 40 percent, or less than around 35 percent, or less than around 30 percent, or even less than around 25 percent of the main surface 34 of the sensor chip 12.

The acoustic coupling medium 18 can contain or be manufactured from at least one of the following materials: silicon, acrylate, rubber-like material, silicon-based material, organic material, etc. The acoustic coupling medium 18 can have, in particular, a viscous, gel-like or rubber-like consistency. A thickness of the acoustic coupling medium 18 in the z-direction perpendicular to the main surface 34 can lie within a range from around 1 micrometer to around 250 micrometers. As an alternative to the aforementioned range limits, the lower range limit can assume a value of around 10 micrometers, or around 20 micrometers, or around 30 micrometers, and/or the upper range limit can assume a value of around 240 micrometers, or around 230 micrometers, or around 220 micrometers.

In the case shown, the acoustic coupling medium 18 can be configured, for example, as a planar or even layer. The layered acoustic coupling medium 18 can have an even thickness in the z-direction over its (in particular entire) extension in the x-y-plane. In the example shown, the acoustic coupling medium 18 can form a single continuous component which can cover (in particular completely) both MEMS structures 4A and 4B. Viewed in the z-direction, the acoustic coupling medium 18 can have any suitable geometric shape, for example circular, elliptical, rectangular, square, polygonal, etc.

One or more components of the sensor device 300 can be encapsulated by an encapsulation material 44 and can thereby be protected against external influences, such as, for example, moisture or mechanical impacts. The encapsulation material 44 can form a housing for at least the sensor chip 12 and the acoustic coupling medium 18. The sensor device 300 can therefore also be referred to as a sensor housing or sensor package. The encapsulation material 44 can be manufactured from at least one of the following: a mold compound, an epoxy or epoxy resin, a filled epoxy, a fiberglass-filled epoxy, an imide, a thermoplastic, a duroplastic polymer, a polymer blend, a laminate, etc. Different techniques can be used to manufacture the housing, for example at least one of the following: compression molding, injection molding, powder molding, liquid molding, map molding, laminating, etc.

In the example shown, the upper main surfaces of the encapsulation material 44 and of the acoustic coupling medium 18 can lie in a common plane and form an outer planar (or even or flat) surface 46 of the sensor device 300. The upper side of the acoustic coupling medium 18 can be uncovered by the encapsulation material 44. A touch-sensitive structure (not shown) can be mechanically coupled or fitted to the outer planar surface 46, as described above in conjunction with FIG. 2. The acoustic coupling medium 18 can be configured to couple the MEMS structures 4A and 4B acoustically to the touch-sensitive structure attached to the outer planar surface 46. In the example shown, the touch-sensitive structure can be attached directly to the upper side of the acoustic coupling medium 18. The number of (ultrasonic) reflecting boundary surfaces can be minimized due to this direct attachment.

The touch-sensitive structures described herein can form, for example, one or more touch-sensitive surfaces of an electronic system. Touch-sensitive surfaces can be used in a multiplicity of technical applications, such as, for example, in touchscreens, automotive electrical devices (particularly in automobile passenger compartments), household devices, entertainment electronics, tablets, cell phones, electronic toys, medical devices, etc. The touch-sensitive surfaces can replace corresponding mechanical components (e.g., mechanical switches, mechanical controls, mechanical buttons, etc.) so that these mechanical components can be eliminated.

Along with the aforementioned components, the sensor device 300 can optionally have a chip carrier 36 and or one or more connection leads 38. The sensor chip 12 can be mounted on the upper side of the chip carrier 36. In the example shown, the chip carrier 36 can be a lead frame or die pad. In further examples, however, the chip carrier 36 can also be configured differently. The electrical contacts 40 of the sensor chip 12 can be electrically coupled via the electrical connection elements 42 to the chip carrier 36 and/or to the connection leads 38. The chip carrier 36 and/or the connection leads 38 can be at least partially uncovered by the encapsulation material 44 so that the sensor chip 12 can be electrically contacted from outside the housing formed by the encapsulation material 44.

Technical effects described below can be provided by the sensor devices according to the disclosure described herein. Reference can be made below, purely by way of example, to the sensor device 300 shown in FIG. 3. However, it is clear that the aforementioned technical effects can also be provided by other sensor devices according to the disclosure described herein.

A defined planar surface which can provide a suitable interface and/or assembly area for an external component, such as, for example, a touch-sensitive structure, can be provided using the outer surface 46. Unwanted impurities (air, dust, dirt, cavities, etc.) between the acoustic coupling medium 18 and the external component can be avoided or at least reduced through the planar design of the surface 46. A simplified integration of the sensor device 300 into a higher-level system can be provided due to the outer surface 46.

Sensor devices according to the disclosure can be configured to reliably determine, based on the measurement signals captured by them, whether a touch-sensitive structure is touched by an operator or not. The detection of physical contact of this type can, in particular, be independent from the material of the touch-sensitive surface. The surface can also consist, for example, of one or more of the following materials: ceramic, plastic, glass, metal, etc.

Use of the acoustic coupling medium 18 in the form of a thin layer can reduce or minimize the number of reflecting boundary surfaces through which transmitted and/or received ultrasonic waves have to pass. An optimum acoustic coupling between the MEMS structures 4A, 4B and a touch-sensitive structure can thus be provided by the acoustic coupling medium 18. The acoustic coupling medium 18 can further provide an optimized decoupling of ultrasonic signals from the MEMS structure 4A and a suitable injection of ultrasonic signals into the MEMS structure 4B.

A thin layer of the acoustic coupling medium 18 can be provided by even a small amount of material. A small amount of material can expand only slightly in the event of temperature fluctuations, as a result of which the risk of delamination of the acoustic coupling medium 18 and therefore damage to the sensor device can be reduced.

Manufacture of the sensor device 300 can be based on workable and low-cost method steps, as described below in conjunction with FIG. 15. In this connection, sensor devices according to the disclosure can be produced, in particular, at wafer level. A large number of low-cost sensor devices can be manufactured in each batch run.

Figure 4:
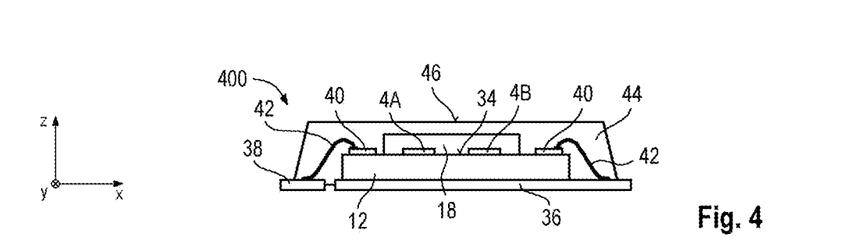
FIG. 4 shows schematically a cross-section side view of a sensor device 400 according to the disclosure.

The sensor device 400 shown in FIG. 4 can have some or all of the features of sensor devices described above. In particular, the sensor device 400 can be similar to the sensor device 300 shown in FIG. 3. In contrast to FIG. 3, the upper side of the acoustic coupling medium 18 can be covered (in particular completely) by the encapsulation material 44. As a result, the acoustic coupling medium 18 can be arranged inside the housing and can be protected against external influences. The outer planar surface 46 of the sensor device 400 to which, for example, a touch-sensitive structure can be acoustically coupled, can be formed entirely by the upper side of the encapsulation material 44 in the example shown.

Figure 5A:
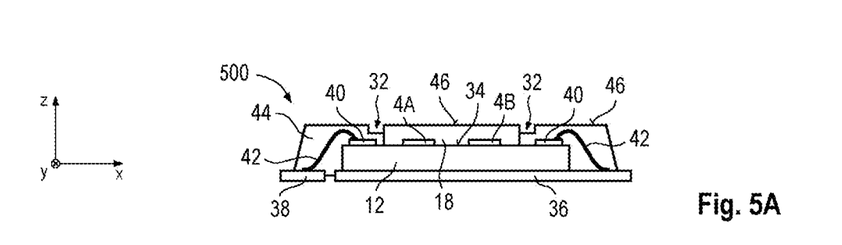
FIGS. 5A and 5B show schematically a cross-section side view or a top view of a sensor device 500 according to the disclosure.
Figure 5B:
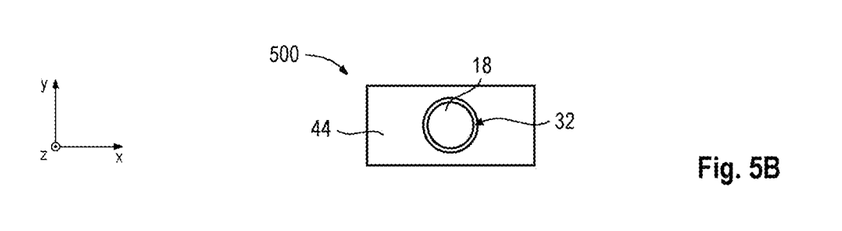

The sensor device 500 shown in FIGS. 5A and 5B can have some or all of the features of sensor devices described above. In particular, the sensor device 500 can be similar to the sensor device 300 shown in FIG. 3. Sensor devices according to the disclosure can be exposed to substantial temperature fluctuations during operation. In one example, a sensor device can be arranged on or at surfaces in the passenger compartment of an automobile, wherein the surface temperatures can assume values within a range from around −20° C. to around 110° C. Compared with other components of the sensor device, the acoustic coupling medium 18 can have a greater expansion coefficient (up to a factor of around seven or eight). The acoustic coupling medium 18 can therefore substantially expand and/or substantially contract in the event of substantial temperature fluctuations. In the case of a completely encapsulated acoustic coupling medium 18, the risk exists that the housing will be damaged and, in an extreme case, can even split. In order to reduce this risk, the sensor device 500 can have one or more accommodating structures which are configured to accommodate expanding parts of the acoustic coupling medium 18.

In the example shown, the accommodating structure 32 can have one or more recesses which extend at least partially around the acoustic coupling medium 18. The recess 32 can be formed, in particular, in the upper side of the encapsulation material 44. In the case shown, the acoustic coupling medium 18, viewed in the z-direction, can have, for example, a circular shape, and the recess 32 can completely surround the acoustic coupling medium. In further examples, the recess 32 can only partially surround the acoustic coupling medium 18 and/or can be interrupted in a plurality of places by the encapsulating material 44. If a touch-sensitive structure (not shown) is attached to the outer surface 46 of the sensor device 500, an annular cavity can be formed by the recess 32 between the sensor device 500 and the touch-sensitive structure. If temperature fluctuations occur, the acoustic coupling medium 18 can expand into this cavity, as a result of which mechanical stresses can be avoided or at least reduced.

Figure 6:
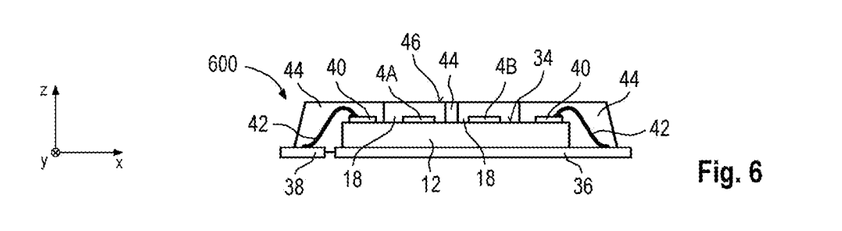
FIG. 6 shows schematically a cross-section side view of a sensor device 600 according to the disclosure.

The sensor device 600 shown in FIG. 6 can have some or all of the features of sensor devices described above. In particular, the sensor device 600 can be similar to the sensor device 300 shown in FIG. 3. In the example shown, the acoustic coupling medium 18 can be separated by the encapsulation element 44 between the two MEMS structures 4A and 4B. In other words, a wall or barrier consisting of encapsulation material 44 can be arranged over the upper side of the sensor chip 12 between the MEMS structures 4A and 4B. In the example shown, upper sides of the encapsulation material 44 and of the acoustic coupling medium 18 can be arranged coplanar or flush in a common plane. In one example, the acoustic coupling medium 18 can be separated by the encapsulation material 44 in at least two sections that are separate from one another. In a further example, the acoustic coupling medium 18 can form a single continuous component despite the barrier.

The part of the encapsulation material arranged between the MEMS structures 4A and 4B can provide an acoustic decoupling between the MEMS structures 4A and 4B or the sections of the acoustic coupling medium 18 lying above them. Acoustic crosstalk between the MEMS structures 4A and 4B can be prevented or at least reduced due to the acoustic decoupling. Ultrasonic signals transmitted by the MEMS structure 4A, for example, can leave the ultrasonic signals received by the MEMS structure 4B undisturbed due to the acoustic decoupling.

Figure 7:
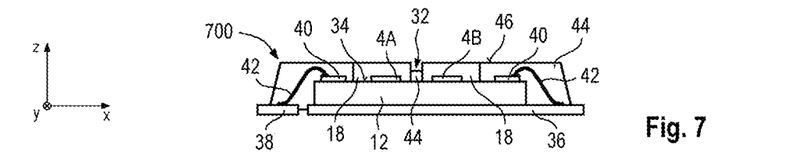
FIG. 7 shows schematically a cross-section side view of a sensor device 700 according to the disclosure.

The sensor device 700 shown in FIG. 7 can have some or all of the features of sensor devices described above. Similar to FIG. 6, the acoustic coupling medium 18 can be separated by the encapsulation element 44 between the two MEMS structures 4A and 4B. Compared with FIG. 6, the wall or barrier consisting of encapsulation material 44 can have a lower height. This can result in an accommodating structure 32 which is configured to accommodate expanding parts of the acoustic coupling medium 18. In the example shown, the accommodating structure 32 can correspond to a recess which can extend between the separated parts of the acoustic coupling medium 18. The recess can be formed, in particular, in the upper side of the encapsulation material 44 between the separated sections of the acoustic coupling medium 18.

Figure 8:
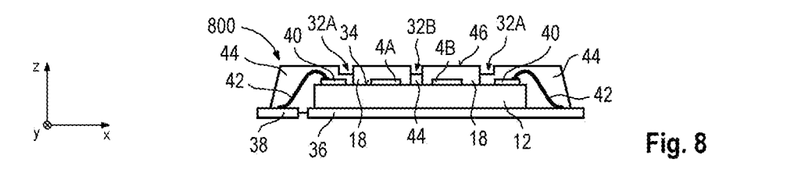
FIG. 8 shows schematically a cross-section side view of a sensor device 800 according to the disclosure.

The sensor device 800 shown in FIG. 8 can be regarded as a combination of the sensor devices 500 and 700 shown in FIGS. 5 and 7. This means that the sensor device 800 can have both an accommodating structure 32A extending at least partially around the acoustic coupling medium 18 and an accommodating structure 32B extending between separated parts of the acoustic coupling medium 18. The accommodating structures 32A and 32B can again be formed, for example, by recesses in the upper side of the encapsulation material 44. The sensor device 800 can provide both an acoustic decoupling of the MEMS structures 4A and 4B and a possible accommodation of expanding parts of the acoustic coupling medium 18 in the recesses 32A and 32B.

Figure 9:
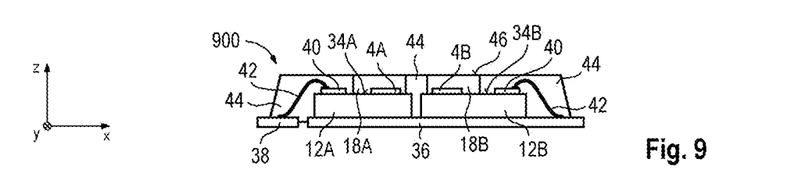
FIG. 9 shows schematically a cross-section side view of a sensor device 900 according to the disclosure.

The sensor device 900 shown in FIG. 9 can have some or all of the features of sensor devices described above. The sensor device 900 can have a plurality of separate sensor chips 12A, 12B. In the example shown, the arrangement can contain a first sensor chip 12A having a first MEMS structure 4A and a first acoustic coupling medium 18A arranged on the first MEMS structure 4A. The sensor device 900 can further have a second sensor chip 12B having a second MEMS structure 4B and a second acoustic coupling medium 18B arranged on the second MEMS structure 4B. The first sensor chip 12A can be separated at least partially and, in particular, completely from the second sensor chip 12B using the encapsulation material 44.

The first sensor chip 12A and the second sensor chip 12B can be configured to transmit or receive ultrasonic signals, as already described in conjunction with preceding figures. The two acoustic coupling media 18A and 18B can correspond in each case to acoustic coupling media described above. In conjunction with FIG. 3 described above, it is indicated that the acoustic coupling medium 18 shown there can cover less than around 50 percent of the main surface of the sensor chip 12. In a similar manner, in FIG. 9, the acoustic coupling media 18A and 18B can cover less than around 50 percent of the main surfaces 34A and 34B of the sensor chips 12A and 12B, or less than around 45 percent, or less than around 40 percent, or less than around 35 percent, or less than around 30 percent, or even less than around 25 percent.

Figure 10:
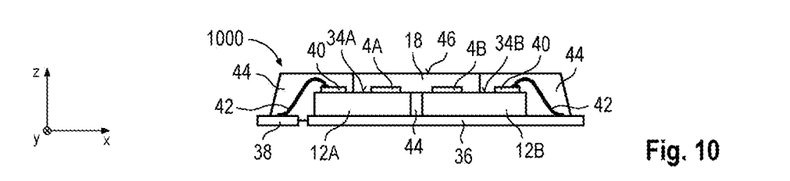
FIG. 10 shows schematically a cross-section side view of a sensor device 1000 according to the disclosure.

The sensor device 1000 shown in FIG. 10 can have some or all of the features of sensor devices described above. In the example shown, the acoustic coupling medium 18 can be arranged continuously on the MEMS structures 4A and 4B of the two sensor chips 12A and 12B. The acoustic coupling medium 18 can be deposited in a single method step on the two MEMS structures 12A and 12B. The manufacture of the sensor device 1000 can be based at least partially on an eWLB (Embedded Wafer Level Ball Grid Array) technology.

Figure 11A:
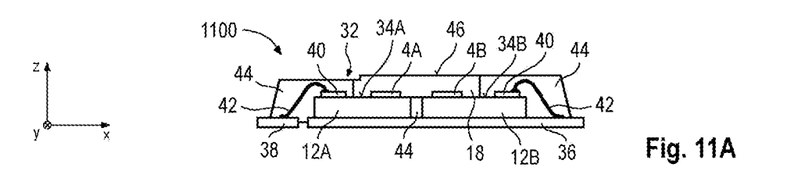
FIGS. 11A and 11B show schematically a cross-section side view or a perspective view of a sensor device 1100 according to the disclosure.
Figure 11B:
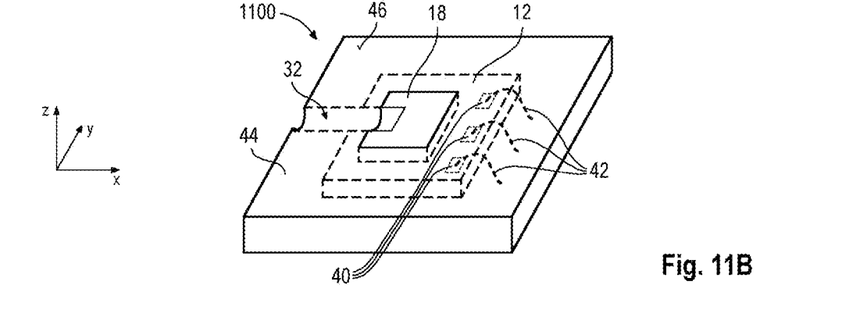

The sensor device 1100 shown in FIG. 11 can have some or all of the features of sensor devices described above. In particular, the sensor device 1100 can be similar to the sensor devices 500 and 1000 shown in FIGS. 5 and 10. Similar to FIG. 5, the sensor device 1100 can have an accommodating structure 32 which is configured to accommodate expanding parts of the acoustic coupling medium 18. In the example shown, the accommodating structure 32 can have a recess which can extend from the acoustic coupling medium 18 to an outer surface of the sensor device 1100. FIG. 11 shows, by way of example, a single recess 32 which extends from the acoustic coupling medium 18 to the left side surface of the sensor device 1100. In further examples, the sensor device 1100 can have one or more further accommodating structures, for example a recess, which extends from the acoustic coupling medium 18 to the right side surface of the sensor device 1100.

The recess 32 can be formed, in particular, in the upper side of the encapsulation material 44. The perspective view shown in FIG. 11B is intended to provide a more precise representation of the recess 32 and shows, by way of example, a channel-like design of the recess 32. In this connection, it should be noted that the perspective view shown in FIG. 11B has a purely qualitative character and is intended to serve, in particular, to illustrate the recess 32. The perspective view shown in FIG. 11B does not therefore necessarily need to be totally consistent with the side view shown in FIG. 11A. Only a single sensor chip 12, for example, is shown in FIG. 11B for the sake of simplicity. The MEMS structures 4A and 4B can further be covered by the acoustic coupling medium 18 arranged on them.

Figure 12:
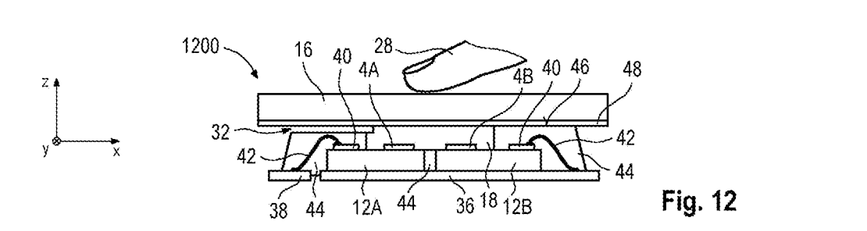
FIG. 12 shows schematically a cross-section side view of a sensor device 1200 according to the disclosure.

The sensor device 1200 shown in FIG. 12 can have some or all of the features of sensor devices described above. In particular, the sensor device 1200 can be similar to the sensor device 1100 shown in FIG. 11. In the case shown, a touch-sensitive structure 16 can be arranged on the surface 46 formed by the upper sides of the acoustic coupling medium 18 and the encapsulation material 44. In the example shown, the touch-sensitive structure 16 can be attached to the surface 46 using an adhesive layer or glue layer 48. In further examples, the touch-sensitive structure 16 can be attached to the surface 46 in a different suitable manner, for example using a clip. The touch-sensitive structure 16 can be regarded as part of the sensor device 1200 or not.

The acoustic coupling medium 18 can couple the MEMS structures 4A and 4B and the touch-sensitive structure 16 acoustically to one another. A channel-like or tunnel-like cavity can be formed between the surface 46 and the touch-sensitive structure 16 using the accommodating structure 32 formed in the upper side of the encapsulation material 44. The acoustic coupling medium 18 can expand into this cavity if temperature fluctuations occur, as a result of which mechanical stresses on the sensor device 1200 can be avoided or at least reduced. If the acoustic coupling medium 18 expands substantially, in the example shown, it can not only expand into the cavity, but can even at least partially reach the outside on the left sidewall of the sensor device 1200.

Figure 13:
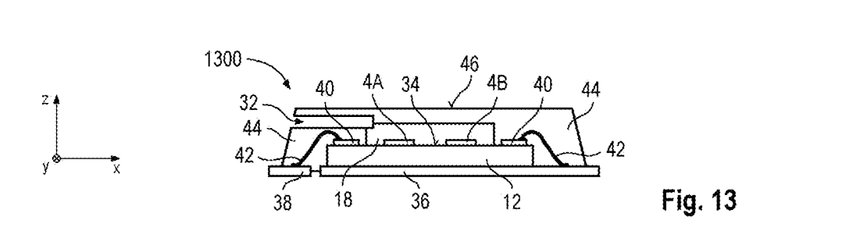
FIG. 13 shows schematically a cross-section side view of a sensor device 1300 according to the disclosure.

The sensor device 1300 shown in FIG. 13 can have some or all of the features of sensor devices described above. In particular, the sensor device 1300 can be similar to the sensor device 1100 shown in FIG. 11. The sensor device 1300 can have an accommodating structure 32 which is configured to accommodate expanding parts of the acoustic coupling medium 18. In the example shown, the accommodating structure 32 can have a recess (or a channel or tunnel) which can extend from the acoustic coupling medium 18 to the left side surface of the sensor device 1300. Whereas the accommodating structure 32 is formed in the upper side of the encapsulation material 44 in FIG. 12, the accommodating structure 32 can be formed in a side surface of the encapsulation material 44 in the example shown in FIG. 13. All inner surfaces of the accommodating structure 32 can be formed by the encapsulation material 44.

Different sensor devices according to the disclosure have been described in the figures above. When considering these examples, it will be clear to a person skilled in the art that features of the different sensor devices can be combined with one another in a technically appropriate manner, or features of one example can readily be used in another example. The accommodating structure 32 shown in FIG. 11, for example, can be used in the sensor device 600 shown in FIG. 6. In a further example, the single sensor chip 12 shown in FIG. 5 can be replaced by two separate sensor chips 12A and 12B, as shown, for example, in FIG. 9. In another further example, the touch-sensitive structure 16 can be arranged in each of FIGS. 3 to 11 and 13 on the respectively shown sensor device. It is clear that not every technically appropriate combination of the features described herein can be described explicitly in a separate example. Nevertheless, such combinations are intended to be comprised by the present disclosure.

Figure 14:
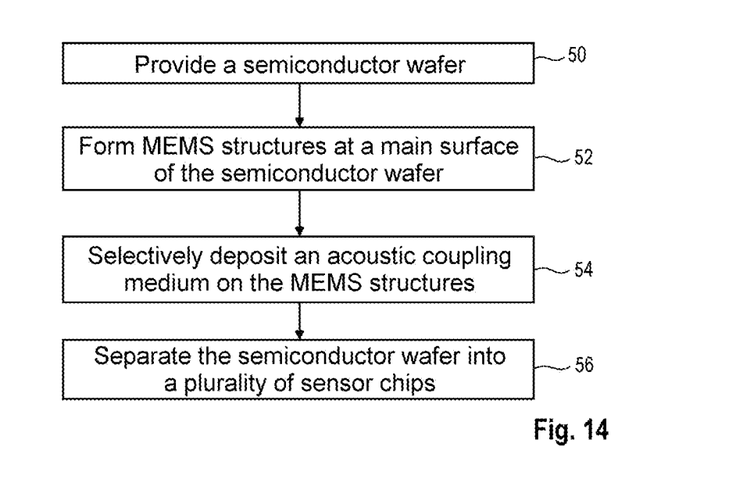
FIG. 14 shows a flow diagram of a manufacturing method according to the disclosure.

FIG. 14 shows a flow diagram of a manufacturing method according to the disclosure. The method can be used, for example, to manufacture one of the sensor devices described above at least partially, and can therefore be read in conjunction with the respective figure. The method is generally presented to describe aspects of the disclosure qualitatively, and can comprise further aspects. The method can be extended, for example, by one or more of the aspects which are described in conjunction with other figures.

A semiconductor wafer can be provided at 50. At 52, structures are formed at a main surface of the semiconductor wafer. The respective MEMS structure can be configured to transmit ultrasonic signals and/or to receive ultrasonic signals. At 54, an acoustic coupling medium can be deposited selectively on the MEMS structures. The acoustic coupling medium can be configured to decouple an ultrasonic signal to be emitted from the respective MEMS structure and/or to inject a received ultrasonic signal into the respective MEMS structure. At 56, the semiconductor wafer can be separated into a plurality of sensor chips. The acoustic coupling medium assigned to a respective sensor chip can only partially cover the main surface of the respective sensor chip.

The method shown in FIG. 15 can be regarded as a more detailed version of the method shown in FIG. 14. In FIG. 15A, a semiconductor wafer 58 can be provided. The semiconductor wafer 58 can be manufactured from any semiconductor material, in particular from silicon. A multiplicity of sensor chips can be manufactured from the semiconductor wafer 58 using the described method. Different types of sensor devices according to the disclosure can be manufactured from the produced sensor chips.

Figure 15A:
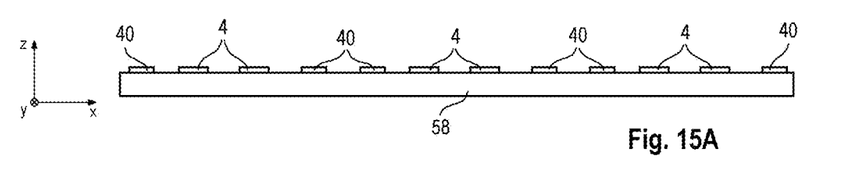
FIGS. 15A to 15D, which show schematically cross-section side views of a manufacturing method according to the disclosure.

A multiplicity of electrical contacts 40 can be formed on the upper side of the semiconductor wafer 58. The electrical contacts 40 can provide an electrical coupling to electronic circuits formed in the semiconductor wafer 58. In a further step, a multiplicity of MEMS structures 4 can be formed on the upper side of the semiconductor wafer 58. The respective MEMS structures 4 can be configured to transmit ultrasonic signals and/or to receive ultrasonic signals. The number and arrangement of the electrical contacts 40 and the MEMS structures 4 can depend on the type of the sensor devices to be manufactured. In the example side view, two MEMS structures 4 are arranged in each case between two electrical contacts 40.

Figure 15B:
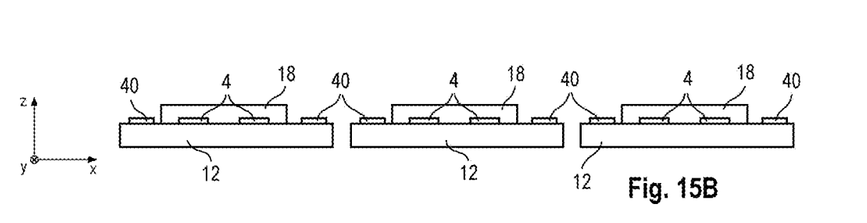

In FIG. 15B, a multiplicity of acoustic coupling medium 18 can be deposited selectively on the MEMS structures 4, in particular in a front-end process. The dimensions and material properties of the acoustic coupling media 18 have already been described in conjunction with preceding figures. In one example, the acoustic coupling media 18 can be deposited based on a photolithographic process. An acoustic coupling medium 18, for example silicon, can first be widely deposited on the upper side of the semiconductor wafer 58. During the photolithographic process, the acoustic coupling medium 18 can be structured as desired and superfluous sections thereof can be removed. Only the sections of the acoustic coupling medium 18 shown in FIG. 15B can then remain on the upper side of the semiconductor wafer 58. Alternatively or additionally, the acoustic coupling media 18 can be based in other cases on a printing process, such as, for example, 3D printing, stencil printing, etc.

The acoustic coupling media 18 can be configured to decouple ultrasonic signals to be emitted from the respective MEMS structure 4 and/or to inject received ultrasonic signals into the respective MEMS structure 4. Following the manufacture of the (structured) acoustic coupling medium 18, the semiconductor wafer 58 can be separated in a further step into a multiplicity of sensor chips 12. The acoustic coupling medium 18 assigned to a respective sensor chip 12 can only partially cover the main surface of the respective sensor chip 12.

In further process steps, different types of sensor devices according to the disclosure can be manufactured from the obtained sensor chips 12. Further process steps for only one sensor chip 12 are indicated by way of example in FIGS. 15C and 15D. It is clear that the process steps described below can be carried out in parallel for any number of sensor chips 12.

Figure 15C:
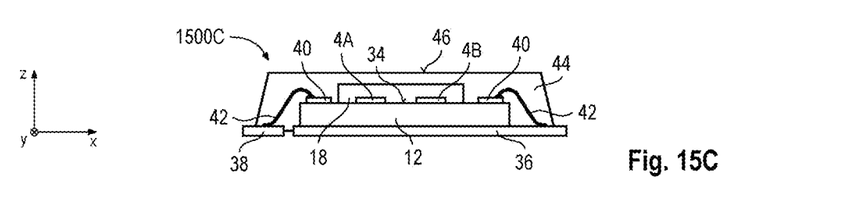

In FIG. 15C, one or more sensor chips 12 can be arranged on a chip carrier 36 (die bonding, chip bonding). The electrical contacts 40 of the sensor chip 12 can be electrically connected via electrical connection elements 42, such as, for example, bonding wires, to the chip carrier 36 and/or to one or more connection leads 38 (wire bonding). In a further step, the components of the arrangement can be at least partially encapsulated in an encapsulation material 44. The sensor device 1500C thus obtained can be similar to the sensor device 400 shown in FIG. 4 and can have some or all of the features thereof. In particular, the outer surface or interface 46 to a touch-sensitive structure (not shown) can be formed entirely by the upper side of the encapsulation material 44. The manufactured housing type can, for example, be an SOT or DSO package.

Figure 15D:
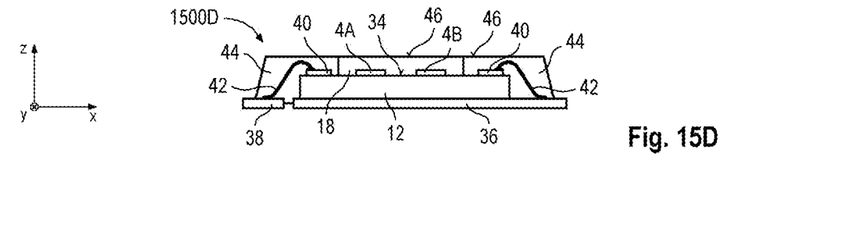

In FIG. 15D, similar to FIG. 15C, one or more sensor chips 12 are arranged on a chip carrier 36, and the electrical contacts 40 of the sensor chip 12 can be electrically connected via electrical connection elements 42 to the chip carrier 36 and/or to one or more connection leads 38. In a further step, the components of the arrangement can be at least partially encapsulated in an encapsulation material 44. The encapsulation can be based here, for example, on a FAM (Film Assisted Mold) technology, e.g., the housing thus obtained can correspond to a FAM package. The manufactured sensor device 1500C can be similar to the sensor device 300 shown in FIG. 3 and can have some or all of the features thereof. In particular, the outer surface or interface 46 to a touch-sensitive structure (not shown) can be formed by coplanar upper sides of the acoustic medium 18 and of the encapsulation material 44.

ASPECTS

Sensor devices and associated manufacturing methods according to the disclosure are explained below based on aspects.

Aspect 1 is a sensor device, comprising: at least one sensor chip having at least one MEMS structure arranged at a main surface of the at least one sensor chip, wherein the at least one sensor chip is configured to transmit ultrasonic signals and/or to receive ultrasonic signals; and an acoustic coupling medium arranged selectively on the at least one MEM structure, wherein the acoustic coupling medium is configured to decouple an ultrasonic signal to be emitted from the at least one MEMS structure and/or to inject a received ultrasonic signal into the at least one MEMS structure, wherein the acoustic coupling medium only partially covers the main surface of the at least one sensor chip.

Aspect 2 is a sensor device according to aspect 1, wherein the acoustic coupling medium covers less than 50 percent of the main surface.

Aspect 3 is a sensor device according to aspects 1 or 2, wherein the acoustic coupling medium is arranged centrally on the main surface, and outer areas of the main surface are uncovered by the acoustic coupling medium.

Aspect 4 is a sensor device according to one of the preceding aspects, wherein a thickness of the acoustic coupling medium in a direction perpendicular to the main surface lies within a range from 1 micrometer to 250 micrometers.

Aspect 5 is a sensor device according to one of the preceding aspects, wherein the acoustic coupling medium comprises at least one of the following: silicon, an acrylate, a rubber-like material, a silicon-based material.

Aspect 6 is a sensor device according to one of the preceding aspects, wherein the acoustic coupling medium is configured to couple the at least one MEMS structure acoustically at least indirectly to a touch-sensitive structure which is attached to an outer planar surface of the sensor device.

Aspect 7 is a sensor device according to one of the preceding aspects, further comprising: an encapsulation material which forms a housing for the at least one sensor chip and the acoustic coupling medium.

Aspect 8 is a sensor device according to aspects 6 and 7, wherein the outer planar area of the sensor device is formed by the encapsulation material and the acoustic coupling medium.

Aspect 9 is a sensor device according to aspects 6 and 7, wherein the outer planar area of the sensor device is formed by the encapsulation material and the acoustic coupling medium.

Aspect 10 is a sensor device according to one of the preceding aspects, further comprising: at least one electrical contact which is arranged on the main surface of the at least one sensor chip and is uncovered by the acoustic coupling medium.

Aspect 11 is a sensor device according to one of the preceding aspects, further comprising: an accommodating structure which is configured to accommodate expanding parts of the acoustic coupling medium.

Aspect 12 is a sensor device according to aspect 11, wherein the accommodating structure comprises a recess which extends from the acoustic coupling medium to an outer surface of the sensor device.

Aspect 13 is a sensor device according to aspects 11 or 12, wherein the accommodating structure comprises a recess which extends at least partially around the acoustic coupling medium.

Aspect 14 is a sensor device according to one of the preceding aspects, wherein: the at least one MEMS structure has two separate MEMS structures, and the acoustic coupling medium is separated by the encapsulation element between the two MEMS structures.

Aspect 15 is a sensor device according to aspects 11 and 14, wherein the accommodating structure comprises a recess which extends between the separated parts of the acoustic coupling medium.

Aspect 16 a sensor device according to one of aspects 1 to 13, wherein: the at least one sensor chip has two separate sensor chips in each case having at least one MEMS structure, and the acoustic coupling medium is arranged continuously on the MEMS structures of both sensor chips.

Aspect 17 is a sensor device according to one of the preceding aspects, wherein the at least one sensor chip comprises at least one capacitive micromachined ultrasonic transducer.

Aspect 18 is a sensor device according to one of the preceding aspects, wherein the sensor device is configured to operate within a frequency range from 500 kHz to 10 MHz.

Aspect 19 is a method, comprising: providing a semiconductor wafer; forming MEMS structures at a main surface of the semiconductor wafer, wherein the respective MEMS structure is configured to transmit ultrasonic signals and/or to receive ultrasonic signals; selectively depositing an acoustic coupling medium on the MEMS structures, wherein the acoustic coupling medium is configured to decouple an ultrasonic signal to be emitted from the respective MEMS structure and/or to inject a received ultrasonic signal into the respective MEMS structure; and separating the semiconductor wafer into a plurality of sensor chips, wherein the acoustic coupling medium assigned to a respective sensor chip only partially covers the main surface of the respective sensor chip.

Aspect 20 is a method according to aspect 19, wherein the acoustic coupling medium is deposited based on a photolithographic process.

Although specific implementations are presented and described herein, it is obvious to a person skilled in the art that a multiplicity of alternative and/or equivalent implementations can replace the shown and described specific implementations without departing the scope of the present disclosure. This application is intended to cover all adaptations or variations of the specific implementations discussed herein. It is therefore intended that this disclosure is limited only by the claims and their equivalents.

What is claimed is:

1. A sensor device, comprising:
   at least one sensor chip having a plurality of MEMS structures arranged at a main surface of the at least one sensor chip,
      wherein the at least one sensor chip is configured to at least one of:
         transmit ultrasonic signals, or
         receive ultrasonic signals; and
   an acoustic coupling medium arranged selectively on the a plurality of MEMS structures,
      wherein the acoustic coupling medium is configured to at least one of:
         decouple an ultrasonic signal to be emitted from the a plurality of MEMS structures, or
         inject a received ultrasonic signal into the a plurality of MEMS structures, and
      wherein the acoustic coupling medium only partially covers the main surface of the at least one sensor chip.

2. The sensor device as claimed in claim 1, wherein the acoustic coupling medium covers less than 50 percent of the main surface.

3. The sensor device as claimed in claim 1, wherein the acoustic coupling medium is arranged centrally on the main surface, and outer areas of the main surface are uncovered by the acoustic coupling medium.

4. The sensor device as claimed in claim 1, wherein a thickness of the acoustic coupling medium in a direction perpendicular to the main surface lies within a range from 1 micrometer to 250 micrometers.

5. The sensor device as claimed in claim 1, wherein the acoustic coupling medium comprises at least one of:
   a silicon,
   an acrylate, or
   a silicon-based material.

6. The sensor device as claimed in claim 1, wherein the acoustic coupling medium is configured to at least indirectly acoustically couple the a plurality of MEMS structures to a touch-sensitive structure, wherein the touch-sensitive structure is attached to an outer planar surface of the sensor device.

7. The sensor device as claimed in claim 6, further comprising:
   an encapsulation material, wherein the encapsulation material forms a housing for the at least one sensor chip and the acoustic coupling medium.

8. The sensor device as claimed in claim 7, wherein the outer planar surface of the sensor device is formed by the encapsulation material and the acoustic coupling medium.

9. The sensor device as claimed in claim 7, wherein the outer planar surface of the sensor device is formed entirely by the encapsulation material.

10. The sensor device as claimed in claim 1, further comprising:
    at least one electrical contact, wherein the at least one electrical contact is arranged on the main surface of the at least one sensor chip and is not covered by the acoustic coupling medium.

11. The sensor device as claimed in claim 1, further comprising:
    an accommodating structure, wherein the accommodating structure is configured to accommodate expanding parts of the acoustic coupling medium.

12. The sensor device as claimed in claim 11, wherein the accommodating structure comprises a recess that extends from the acoustic coupling medium to an outer surface of the sensor device.

13. The sensor device as claimed in claim 11, wherein the accommodating structure comprises a recess that extends at least partially around the acoustic coupling medium.

14. The sensor device as claimed in claim 1, wherein:
    the a plurality of MEMS structures has two separate MEMS structures,
    the acoustic coupling medium is separated by an encapsulation material between the two separate MEMS structures, and
    the encapsulation material forms a housing for each of the two separate MEMS structures and the acoustic coupling medium.

15. The sensor device as claimed in claim 14, wherein an accommodating structure configured to accommodate expanding parts of the acoustic coupling medium comprises a recess which extends between parts of the acoustic coupling medium that are separated by the encapsulation material.

16. The sensor device as claimed in claim 1, wherein:
    the at least one sensor chip has a first sensor chip and a second sensor chip that is separate from the first sensor chip,
    the first sensor chip and the second sensor chip each includes a plurality of MEMS structures, and
    the acoustic coupling medium is arranged continuously on at least one of the plurality of MEMS structures of the first sensor chip and at least one of the plurality of MEMS structures of the second sensor chip.

17. The sensor device as claimed in claim 1, wherein the at least one sensor chip comprises at least one capacitive micromachined ultrasonic transducer.

18. The sensor device as claimed in claim 1, wherein the sensor device is configured to operate in a frequency range from 500 kHz to 10 MHz.

19. A method, comprising:
    providing a semiconductor wafer;
    forming a plurality of MEMS structures at a main surface of the semiconductor wafer,
       wherein each MEMS structure, of the plurality of MEMS structures, is configured to at least one of:
          transmit ultrasonic signals, or
          receive ultrasonic signals;
    selectively depositing an acoustic coupling medium on the plurality of MEMS structures,
       wherein the acoustic coupling medium is configured to at least one of:
          decouple an ultrasonic signal to be emitted from the plurality of MEMS structures, or inject a received ultrasonic signal into the plurality of MEMS structures; and separating the semiconductor wafer into a plurality of sensor chips, wherein a portion of the acoustic coupling medium deposited on each sensor chip, of the plurality of sensor chips, only partially covers a main surface of the sensor chip.

20. The method as claimed in claim 19, wherein the acoustic coupling medium is deposited based on a photolithographic process.

* * * * *

UNITED STATES PATENT AND TRADEMARK OFFICE
CERTIFICATE OF CORRECTION

PATENT NO. : 12,086,363 B2  
APPLICATION NO. : 18/456754  
DATED : September 10, 2024  
INVENTOR(S) : Klaus Elian et al.

Page 1 of 1

It is certified that error appears in the above-identified patent and that said Letters Patent is hereby corrected as shown below:

In the Claims

In Claim 1, Column 15, Line 27, "a plurality of MEMS structures," should be changed to -- plurality of MEMS structures, --;

In Claim 1, Column 15, Line 31, "a plurality of MEMS structures," should be changed to -- plurality of MEMS structures, --;

In Claim 6, Column 15, Line 55, "the a plurality of MEMS structures" should be changed to -- the plurality of MEMS structures --;

In Claim 14, Column 16, Line 23, "the a plurality of MEMS structures" should be changed to -- the plurality of MEMS structures --.

Signed and Sealed this  
Thirty-first Day of December, 2024

Derrick Brent  
*Acting Director of the United States Patent and Trademark Office*